United States Patent [19]

Brunet et al.

[11] Patent Number: 4,930,999

[45] Date of Patent: Jun. 5, 1990

[54] PRECOMPRESSION METERING PUMP WITH IMPROVED PRIMING

[75] Inventors: Michel Brunet, Sainte Colombe La Commanderie; Patrick Di Giovanni, Elbeuf; Claude Jouillat, Montigny Sur Avre; Jean-Pierre Lina, Le Neubourg; Hervé Pennaneac'h, Verneuil-Sur-Avre, all of France

[73] Assignee: Societe Technique de Pulverisation - STEP SA, Paris, France

[21] Appl. No.: 360,693

[22] Filed: Jun. 2, 1989

[30] Foreign Application Priority Data

| | | | |
|---|---|---|---|
| Jun. 2, 1988 | [FR] | France | 88 07337 |
| Dec. 19, 1988 | [FR] | France | 88 16722 |
| May 24, 1989 | [FR] | France | 89 06817 |

[51] Int. Cl.[5] .......................... F04B 21/04; G01F 11/0

[52] U.S. Cl. .................................... 417/552; 417/550; 417/553; 222/321

[58] Field of Search ............... 417/435, 550, 552, 553; 222/321, 380, 383, 385

[56] References Cited

U.S. PATENT DOCUMENTS

| | | | |
|---|---|---|---|
| 4,735,347 | 4/1988 | Schultz et al. | 222/385 |
| 4,776,498 | 10/1988 | Maerte et al. | 222/385 |
| 4,821,928 | 4/1989 | Su | 222/385 |

*Primary Examiner*—Leonard E. Smith
*Assistant Examiner*—John A. Savio, III
*Attorney, Agent, or Firm*—Sughrue, Mion, Zinn, Macpeak and Seas

[57] ABSTRACT

A precompression metering pump of the prior art which is otherwise particularly advantageous, is nevertheless difficult to prime because of the high degree of compressibility of the air it initially contains in its pump chamber. The present invention improves this aspect of metering pump operations. It consists in providing additional resilient means (20) and at least one cylindrical part (10) level with the conventional outlet non-return valve of the pump and constituting a second outlet non-return valve. In a particular embodiment, the resilient means and the cylindrical part are received one above the other in the outlet channel (33) of the pump actuator rod (31). To do this, they bear respectively against a choking step (32) in the form of a lug and a shoulder (34) presented by said channel. In normal operation, the differential piston (4) of the pump moves out of the way so that operation takes place as in a prior art precompression metering pump. However, when priming, by pushing the actuator rod (31) fully home, as is made possible by the invention, the part (10) is moved away from the choking step (32). This improvement thus enables the air which was initially contained in the pump chamber (23) to be expelled to the atmosphere.

30 Claims, 6 Drawing Sheets

FIG.4
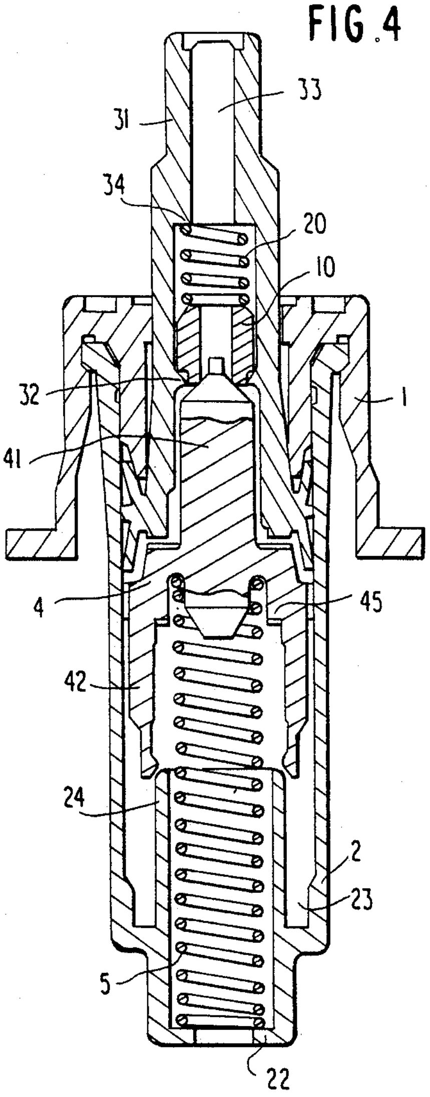
FIG.6
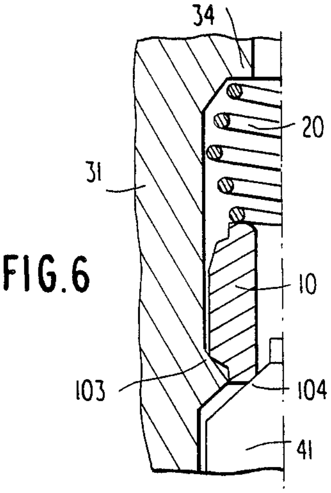
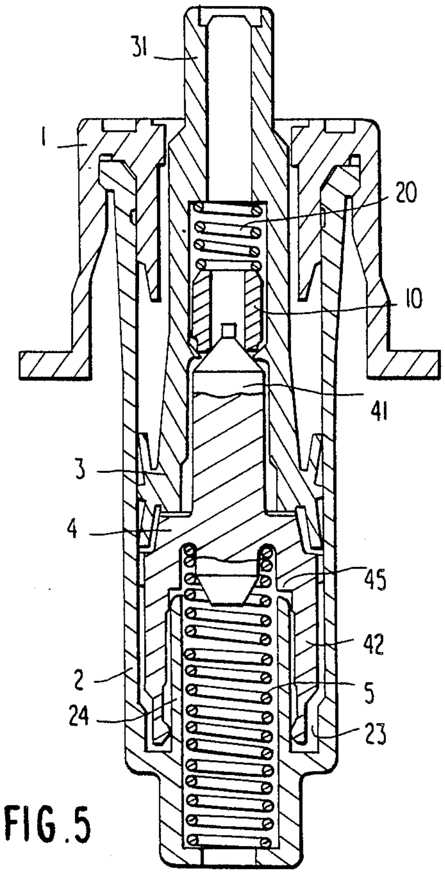
FIG.5

PRECOMPRESSION METERING PUMP WITH IMPROVED PRIMING

The present invention relates to a precompression metering pump with improved priming.

BACKGROUND OF THE INVENTION

Of the various types of dispensing valve currently placed on receptacles containing liquids or pastes, precompression metering pumps have numerous advantages. Firstly the fluid substance is delivered essentially due to manual action. This avoids the need for a propellant gas such as freon, now known to be an atmospheric pollutant, or such as nitrogen which occupies dead volume in the receptacle. In addition, the receptacle no longer needs to be specially reinforced in order to contain a substance under high pressure. The metering function is also very useful in the cosmetic industry and the pharmaceutical industry where the quantity of substance delivered each time the pump is actuated needs to be quite accurate. The precompression of the volume of substance to be expelled also makes using this type of valve particularly clean, both by avoiding any untimely leaks, and by ensuring that the substance runs out with the desired vigor. Finally, this disposition ensures good isolation between the contents of the receptacle and ambient air, thereby avoiding the dispensing valve becoming clogged by dried or oxidized substance.

A particularly advantageous precompression metering pump was designed, at least in principle, by the firm Rudolph Albert (see French patent No. 1 486 392, filed in 1966). It is of increased reliability and accuracy, and it makes do with only one return spring, and as a result it has been subject to continual improvement ever since. Three of the figures accompanying this description are vertical sections through one particular embodiment of this prior art pump which is described to illustrate the technological background. The embodiment shown is much more recent than the above-mentioned patent, and is substantially the same as the pump disclosed in French patent No. 2 305 241 filed by the firm S.T.E.P. in 1975, and this version of the pump is capable of operating with its valve in any orientation relative to the vertical.

From accompanying FIGS. 1 to 3 which show the pump at different moments while it is in use, it can be seen that it comprises five cylindrical parts which are assembled in such a manner that their respective axes of revolution coincide. In the figures, the resulting common axis is disposed vertically. Thus, the substance is delivered via the top portions of the sections while the bottom portions thereof are for insertion into a receptacle or tank (not shown) containing the substance to be delivered.

The five component parts of the prior art pump are as follows:

a turret 1 having a base 11 for fitting to the neck of the tank containing the substance and for being fastened thereto in sealed manner by complementary means (also not shown);

a pump body 2 whose top end 21 snap-fastens in the above turret 1 and whose bottom end 22 communicates with the inside of the tank either directly (as shown), or else via a dip tube fitted over a tube-receiving endpiece (not shown) on the body 2. In addition, a sleeve 24 extends the bottom 22 of the pump body inwards. The annular base between said sleeve 24 and the pump body 2 correspond essentially to the pump chamber 23 of the metering pump;

a first piston 3 suitable for sliding in sealed manner inside the pump body 2 from a high position shown in FIG. 1 (with the piston 3 being in contact with an inside rim 12 of the turret 1) to a low position shown in FIG. 2, and defined in a manner explained below. The piston 3 also extends upwards in the form of an actuator rod 31. The rod has a central channel 33 through which the substance is delivered. The cross-section of the channel is not constant, and in particular there is a choking step 32 about halfway along the channel 33;

a differential piston 4 which extends upwards in the form of a valve needle 41 engaged inside the rod 31 of the first piston 3 such that the conical tip of the needle is shaped to rest against the choking step 32. Downwardly, the differential piston 4 is extended by a skirt 42 adapted to fit around the sleeve 24 integral with the pump body 2. The outside surface of the skirt 42 serves for guidance purposes inside the pump body 2, while its inside surface has an inwardly directly sealing lip 43. The lip serves to cut off communication between the tank and the pump chamber 23 as soon as the two parts are engaged. The inside surface of the skirt 42 is also provided with a shoulder 45 for coming into abutment against the sleeve 24, thereby defining the bottom position of the differential piston 4 (see FIG. 2). Between its needle 41 and its skirt 42, the differential piston has an upwardly directed step 44 which determines its mode of hydraulic operation; and a return spring 5 disposed between the differential piston 4 and the bottom 22 of the pump body 2.

In order to cause a measured quantity of substance to be delivered, it is necessary to push the rod 31 of the first piston 3 manually into the pump body 2. This ensures that the needle 41 is engaged against the choking step 32, since the spring 5 tends to oppose the descent of the differential piston 4. The resilience of the parts contribute to establishing sealed contact, thereby ensuring that the delivery channel 33 is closed. Simultaneously, the differential piston 4 is driven towards the bottom 22 of the pump body 2. The skirt 42 of the piston 4 thus engages over the sleeve 24 of the pump body 2 such that the pump chamber 23 is isolated both from the outside and from the tank. Assuming that it was initially full of substance, the pressure of the substance will increase rapidly due to the forced reduction in volume of the chamber 23. However, this pressure is also applied to the step 44 on the differential piston 4 and the area of this step is deliberately greater than the area of the bottom edge of the skirt 42. As a result, once the pressure becomes high enough, it exerts a vertical force on the differential piston 4 capable of overcoming the force from the spring 5. The needle 41 then withdraws from the choking step 32, thus leaving an open passage to the outside for the substance under pressure. The various parts are then in the configuration shown in FIG. 3.

As soon as the pressure in the substance in the pump chamber 23 drops off, the spring 5 closes the delivery channel 33 by thrusting the needle 41 of the differential piston 4 back against the choking step 32 of the rod 31. When the manual force is released, the spring 5 causes both pistons 3 and 4 to rise. The volume of the pump chamber 23 then increases again. This therefore sets up suction. As soon as the skirt 42 of the differential piston 4 disengages from the sleeve 24, substance is sucked from the tank into the chamber 23. The substance contained in the chamber 23 then constitutes the next metered quantity which will be delivered when the pump is next operated.

However, this mode of operation requires the pump chamber 23 to be satisfactorily filled initially. Priming is the weak point of this type of precompression metering pump. If the pump chamber 23 contains air, then its reduction in size is not sufficient to compress gas adequately since gas is much more compressible than are the liquids or pastes which are normally delivered. The volume of air is therefore not expelled from the pump chamber 23 since the needle 41 remains pressed against the choking step 32. When the pistons move back up, no suction is established and no significant quantity of substance is drawn into the chamber.

This problem of priming was recognized very early on. In 1971, the firm S.T.E.P. proposed a remedy in French patent No. 2 133 259. The idea was to allow the air compressed in the pump chamber to escape therefrom so as to contribute to establishing suction therein when its volume was next increased. However, so far, this idea has only been put into practice when delivering compressed air to the inside of the receptacle.

For the pump shown in FIGS. 1 to 3, this is advantageously achieved by means of a small spline 25 placed at the base of the sleeve 24 inside the chamber 23. When the chamber is full of air, the differential piston 4 can be pushed right down (i.e. until its inside shoulder 45 comes into abutment against the top of the sleeve 24). As shown in FIG. 2, the small spline 25 then raises the skirt 42 locally so that air can escape towards the inside of the pump body 2 which is in communication with the tank. It should be observed that the skirt will not be raised after the pump has been primed since the length of the small spline is chosen to be short enough to ensure that substance is delivered prior to the piston 4 being pushed down to spline level.

This method of priming is particularly suitable for liquids that may be left in contact with air. However for pastes, injecting air into the tank merely leaves a bubble which generally adheres to the pump body 2. Thus, when the pistons rise, the air in the bubble is preferentially sucked back into the pump chamber 23, and the chamber therefore never primes. As for substances which must be kept out of contact with the air, it is clear that injecting air into the receptacle must be avoided. Thus, the object of the present invention is to modify the prior art precompression metering pump described above in order to improve priming without injecting the air initially contained in the pump chamber into the tank of substance to be delivered.

SUMMARY OF THE INVENTION

More precisely, the present invention provides a precompression metering pump for dispensing a liquid or a paste and having improved priming, said pump comprising:

a pump body having a bottom communicating with a tank of said substance and a top open to the atmosphere;

a hollow piston for isolating a pump chamber inside said pump body, and for putting it under pressure, said hollow piston extending via said open top of said pump body in the form of an actuator rod which is pierced from end to end by an outlet channel opening out to a free end of said rod;

a differential piston received in said pump chamber in order to interrupt communication between said tank and said outlet channel; and a return spring for returning said hollow piston and said differential piston;

the metering pump being improved in that it is further provided with a priming assembly including resilient means and at least one cylindrical part which co-operates with said differential piston and said actuator rod in order to constitute, within said outlet channel, a first outlet nonreturn valve reserved for dispensing said substance, and a second outlet non-return valve enabling the air initially contained in said pump chamber to be evacuated to the atmosphere, said first non-return valve being closed when said second non-return valve is open, and vice versa.

The structure of the present priming assembly whose function is defined above is itself defined in accompanying claims 2 et seq.

BRIEF DESCRIPTION OF THE DRAWINGS

Embodiments of the invention are described by way of example with reference to the accompanying drawings, in which:

In FIG. 1 the pump is shown at rest, in FIG. 2 it is shown during a priming stage, and in FIG. 3 it is shown during a stage for delivering a liquid or a paste.

FIGS. 4 to 6 are longitudinal sections through a first version of a precompression metering pump including the improvement of the invention. The pump assembly is shown in its rest position in FIG. 4 and in its priming position in FIG. 5, while FIG. 6 merely shows a detail of the inside channel of the corresponding actuator rod.

FIG. 7 shows it in the rest position and FIG. 8 shows it in the priming position.

FIGS. 10 and 11 show the pump in its rest position, and they differ by a special adaptation to the pump of FIG. 11 which provides it in conventional manner with progressive admission properties.

FIG. 15 shows the pump in the rest position and FIG. 16 shows it during priming.

DETAILED DESCRIPTION

Figure 3:
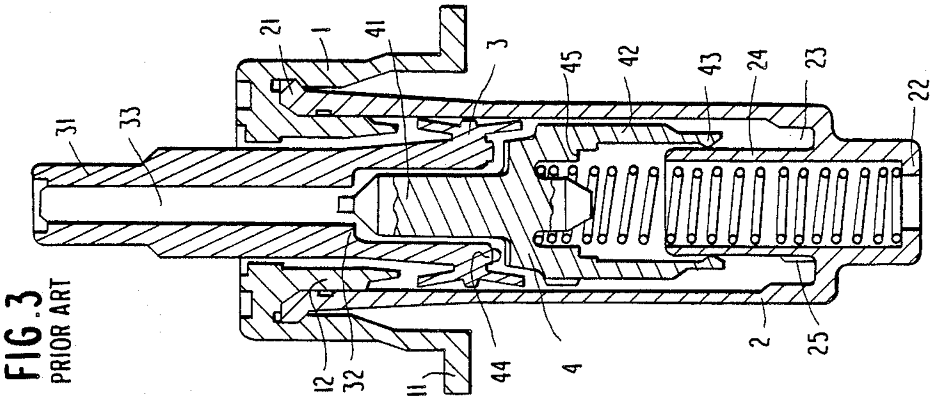
FIG. 3 PRIOR ART
FIGS. 1 to 3 are longitudinal sections through a prior art precompression metering pump of the type to which the present invention is applicable.
Figure 2:
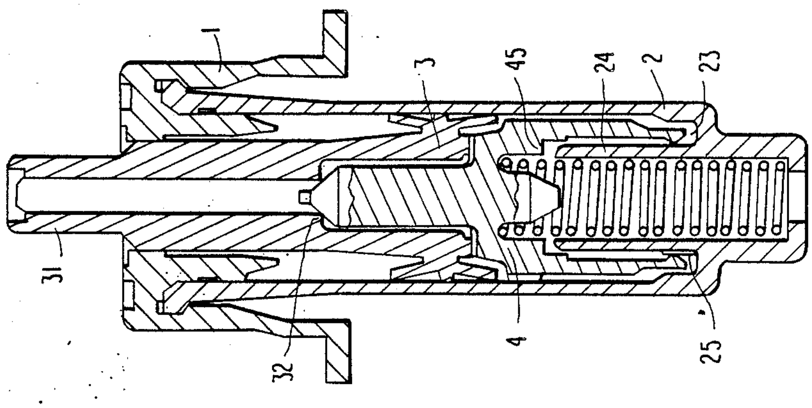
FIG. 2 PRIOR ART
Figure 1:
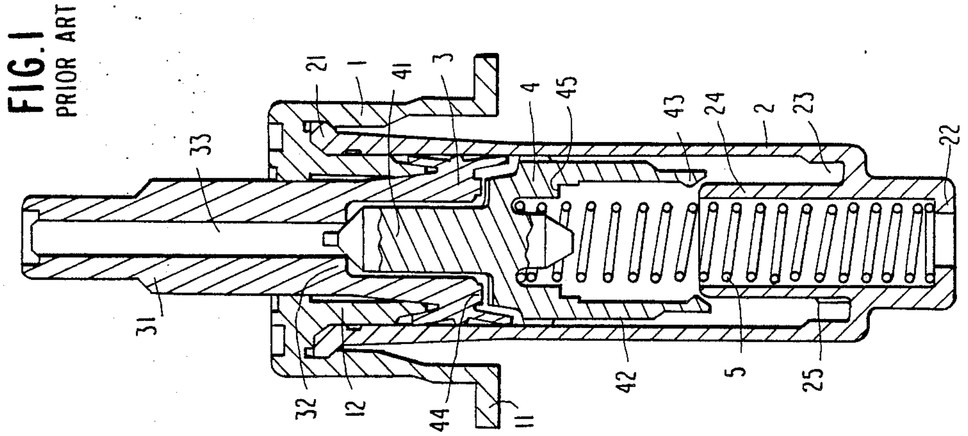
FIG. 1 PRIOR ART

In all of the figures, equivalent parts are given the same reference numerals. This applies in particular to the five cylindrical components sharing a common axis and constituting the prior art precompression metering pump as described above, namely: the turret 1 and the pump body 2 which are fixed on the tank, the hollow first piston 3, the differential piston 4, and the spring 5, all three of which are free to move inside the body of the pump 2. As described below, all of the modifications made in accordance with the present invention concern the engagement between the needle 41 of the differential piston 4 and the rod 31 of the hollow first piston 3. They all require at least one additional part (reference numeral 10) to be inserted together with resilient means 20 urging said additional part relative to the rod 31, or to the needle 41, or tending to urge the rod and the needle relative to each other.

Thus, in a first variant of the present improvement as shown in FIGS. 4 to 6, it can be seen that the channel 33 inside the rod 31 is enlarged, compared with the prior art, downstream from the choking step 32. The step is reduced to the form of an annular lug 32, with the reference numeral 32 being used for this purpose in all of the variants of the invention. A ring 10 is received in the enlarged portion of the channel 33 together with a cylindrical spring 20, both coaxial with the channel 33 and placed axially one after the other with a degree of radial clearance. At one end, the ring 10 has an outer bottom surface 103 which comes into abutment against the lug 32. At the opposite end, the spring 20 bears against a shoulder 34 inside the rod 31 where the widening of the channel 33 returns to its conventional size before the exit from the rod. The spring 20 must be very stiff so that in normal operation of the pump, it behaves as in the prior art (see FIG. 3). If need be, the spring may be precompressed. When the actuator rod 31 is pressed down, it now transmits its motion to the piston 4 via contact between the needle 41 and the inner portion 104 of the inside surface at the base of the ring 10 (see FIG. 6). Thereafter, the precompression of the substance causes the needle 41 to be withdrawn and contact is broken while the substance flows out passing between the conical tip of the needle 41 and the ring 10.

During priming, things take place differently. As already mentioned when describing the prior art, the great compressibility of the air which is initially contained in the pump chamber 23 makes it possible to move the piston 4 down until it comes into abutment via its shoulder 45 against the end of the sleeve 24. The relative position of the bottom surfaces 103 and 104 on the cylindrical part 10 and the shape of the lug 32 inside the rod 31 (see FIG. 6) are such as to make it possible to push the actuator rod 31 down even further. Thus, if the user presses the rod 31 right down, i.e. until the base of the hollow piston 3 engages the step 44 on the differential piston 4, then the user can compress the spring 20, thereby breaking the sealing contact previously established between the outer bottom surface 103 of the ring 10 and the lug 32. The compressed air is then provided with a passage between the ring and the rod and can escape from the tank. The compressed air is thus removed from the pump chamber 23. Air is not injected into the receptacle, and conditions are now suitable for priming as described above.

As shown in FIG. 6 which shows a detail of this first variant of the invention, the base of the ring 10 is conically shaped. This improves contact between its outer surface 103 and the lug 32 which is merely in the form of a projection. This also serves to center the ring 10 automatically relative to the conical tip of the needle 41 which ensures that contact is made with the inside surface 44 even if the parts tend to slop about. Finally, it is advantageous for both ends of the ring to be shaped in identical manner. This ensures that the parts can be assembled without making sure that the ring 10 is inserted the rightway round inside the rod 31.

This mode of operation relies on good sealing between the lug 32 and the surface 103 of the ring 10. In particular, the lug should be manufactured with care to ensure that the ring 10 presses appropriately thereagainst as urged by the spring 20, and as assisted by the resilience of the contacting surfaces Unfortunately, the rod 31 is normally molded in plastic material integrally with the hollow first piston 3. This is difficult to do if the channel 33 contains both the shoulder 34 and the lug 32. The mold needs to have a central finger which is complementary in shape to the channel 33. This finger would then require to have an intermediate length of greater thickness. Thus, when it is removed by force from the molded part, this length of greater thickness rubs against the lug 32 and deforms it. A similar situation arises when the ring 10 and the spring 20 are subsequently put into place. Finally, experience shows that the lug 32 may be so badly damaged as to be incapable of co-operating satisfactorily with the ring 10.

Figure 7:
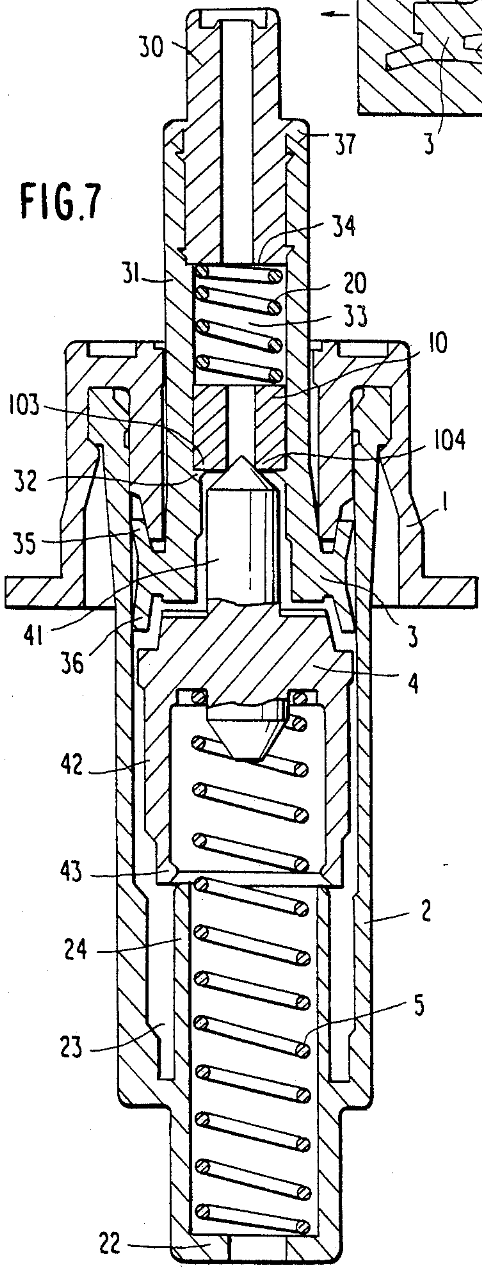
FIGS. 7 and 8 are longitudinal sections through a second variant of a precompression metering pump including the improvement of the present invention.
Figure 8:
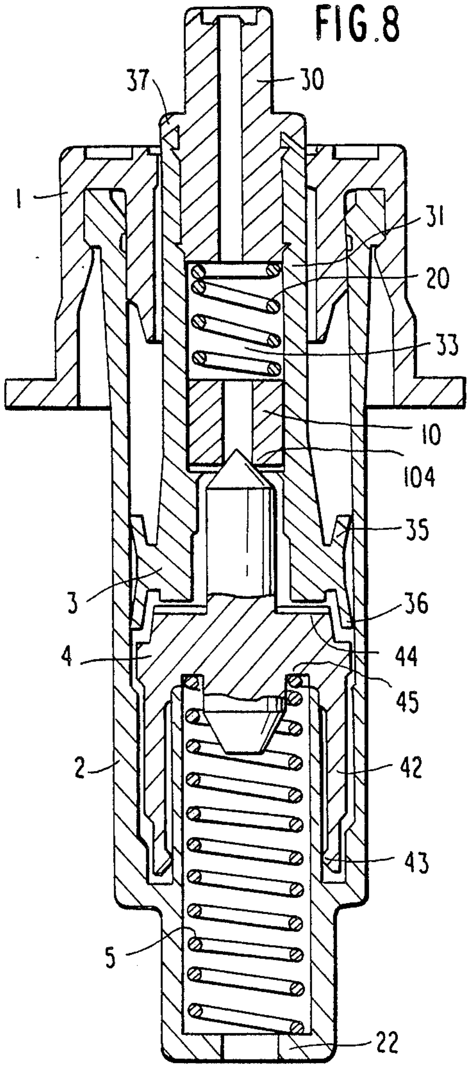

Thus, a second variant of the present invention has been developed as shown in FIGS. 7 and 8. It differs from the first variant essentially in the shape of its actuator rod 31. The rod now comprises a main part which is very similar to the first piston 3 described above and which indeed comprises a major part of the above-described rod 31. Its inside channel 33 has a similar lug 32. However, the shoulder 34 is absent. Instead, the channel becomes slightly larger still. In addition, the narrow terminal portion of the rod 31 is removed. This portion is now recreated by an end fitting 30 which fits into the end of the channel 33 in the main part. The shoulder 34 is thus determined by the base of the end fitting 30 which narrows the channel.

In order to enable the end fitting 30 to be adequately installed on the main part of the first piston 3, the outside surface of the end fitting 30 preferably includes two annular serrations. These may either snap-fasten in complementary grooves provided in the wall of the channel 33 (not shown), or else they may bite directly into said wall, providing the substance from which the main part is made is suitable for this purpose. If it is, the end fitting 30 advantageously has an outwardly projecting collar 37. The collar then serves as an abutment for adjusting the depth to which the end fitting 30 is thrust into the channel 33.

Figure 9:
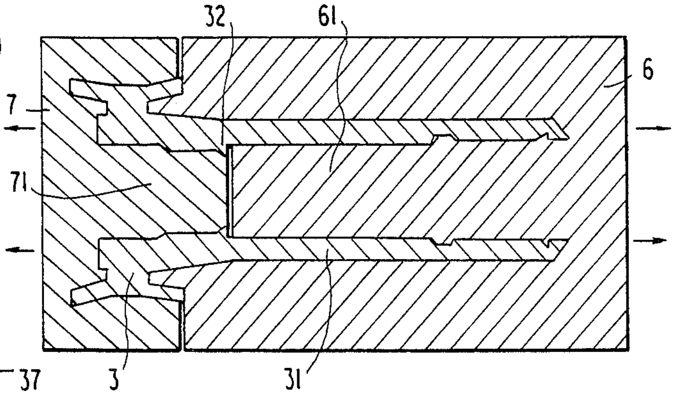
FIG. 9 is a section through a mold suitable for use in manufacturing the actuator rod used in the precompression metering pump of FIGS. 7 and 8.

The main part can thus easily be manufactured by molding. As shown diagrammatically in FIG. 9, the mold may comprise two dies, for example. A first die 6 includes a central finger 61 corresponding to the shape of the delivery channel 33 from the free end of the main part constituting the rod 31 as far as the lug 32. A second die 7 includes a projection 71 which is complementary in shape to the piston portion 3 per se and which also extends as far as the lug 32. By moving these two dies away from each other (see arrows in FIG. 9), the manufacturer can thus release the main part without damaging the lug 32. It may be observed that in this embodiment, the lug 32 is advantageously shaped as a sealing lip, which can be obtained to the desired degree of quality when molding in this manner. In order to obtain a rod 31 providing the same functions as that shown in FIGS. 4 to 6, the ring 10 and the spring 20 are inserted one after the other via the free end of the main part, after which the end fitting 30 is snapped into position, which fitting is molded separately. During this final assembly operation, the lug 32 is not subjected to damaging forces and the user may have confidence in its sealing qualities.

In another embodiment of this second variant, the end fitting 30 may be integrally formed with the ring 10. The resilience required for urging the ring against the lug 32 is then advantageously provided by tongues molded between the base of the end fitting 30 and the top surface of the ring 10. Such tongues may either run parallel to the axis of symmetry of the assembly, in which case they fold towards the surface of the channel 33 or else they may be disposed in a spiral in which case they move closer together. Naturally, this second embodiment is very convenient when assembling the pump since three component parts can be assembled in a single operation.

In addition, the end fitting 30 is preferably made of a plastic material which is relatively rigid. It constitutes the portion of the hollow first piston 3 which is actuated directly. Often, the pushbutton which is itself rigid is mounted directly thereon in order to facilitate manipulation by the user. The transmission of force between the pushbutton and the end fitting 30 is thus made more reliable. However, the main part of the hollow first piston 3 includes sealing lips 35 and 36 enabling it to move in sealed manner along the pump body 2. It is therefore advantageous to make it from a plastic material which is relatively flexible. This gives rise to having a rigid material in contact with a flexible material, and there is no guarantee that the resulting connection will be strong enough or that it will remain strong enough in spite of the metering pump aging in order to withstand the thrust exerted on the end fitting 30 by the resilient means 20. In the long run, there is a danger of the end fitting being disconnected with fatigue or creep of the materials changing the fastening qualities they provide, be that due to a force fit or to a snap fit.

Figure 10:
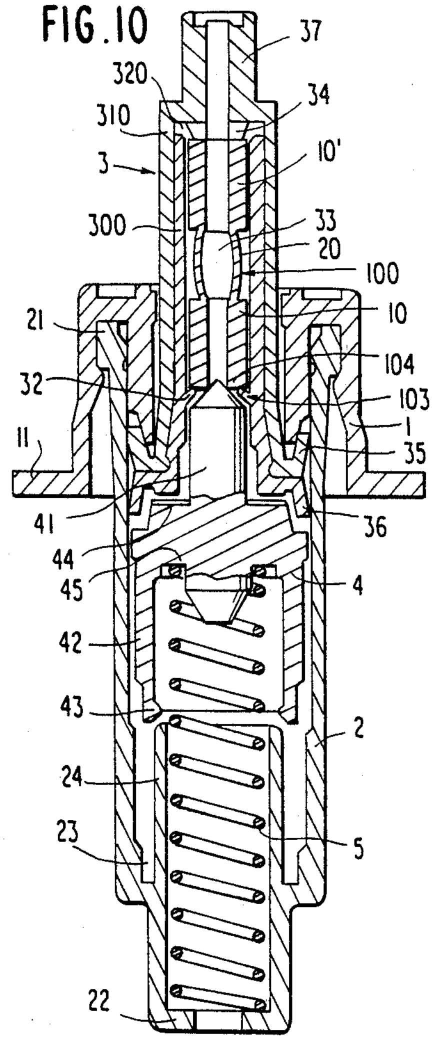
FIGS. 10 and 11 are longitudinal sections through a third variant of a precompression metering pump including the improvement of the present invention. Both
Figure 11:
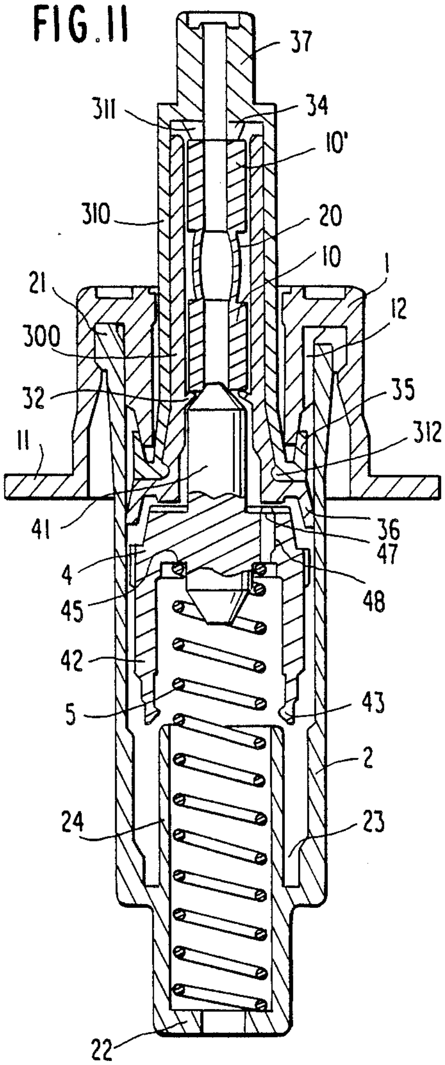

The third variant of the invention is designed to mitigate this danger. FIGS. 10 and 11 show this third variant in which the first piston 3 is constituted by two hollow cylinders 300 and 310 engaged in each other. The inner cylinder 300 includes a sealing lip 36 directed towards the bottom 22 of the pump body so as to slide in sealed manner within the pump body. It is extended upwardly by a rod which is pierced by a central channel 33 for delivering substance. An annular lug 32 projects into the channel 33 about half way up it, and the lug is advantageously in the form of a sealing lip directed towards the exit from the channel 33.

The outer cylinder 310, in this embodiment, also has a sealing lip 35 directed towards the top end 21 of the pump in order to slide in sealed manner inside the pump body 2 In a manner more characteristic of the present invention, it extends upwards in the form of a rod. This rod surrounds the rod of the inner cylinder 300 and is smaller in size above it to constitute a hollow terminal portion 37 which extends the channel 33.

Advantageously, an empty space 320 is left between the end of the rod of the inner cylinder 300 and the smaller diameter portion of the outer cylinder 310. In addition, a seat 34 projects into the channel 33 from the base of the terminal portion 37 of the rod of the outer cylinder 310. This seat 34 has various radial slots 311 putting the empty space 320 into communication with the channel 33.

Advantageously, an annular notch 312 is provided in the outer root of the rod of the inner cylinder 300. A complementary annular projection is provided at the inner root of the rod on the outer cylinder 310. As a result the two cylinders can be snap fastened together when their respective rods are engaged.

A priming assembly 100 is used in this third variant. This assembly 100 could equally well be used with the two variants described above instead of the ring 10 and the resilient means 20. The assembly 100 is constituted by two identical rings 10 and 10' interconnected by a cylindrical partition 20 about the same axis as the rings. When no outside force is applied thereto, the partition constitutes, for example, a thin hollow cylinder having the same inside diameter as the two rings 10 and 10'. However, its thin wall thickness makes it possible for it to bend, thereby enabling it to take up the barrel-shape shown in the drawings. It should nevertheless be stiffer than the spring 5.

The priming assembly 100 is received inside the the channel 33. Although radial clearance is still provided, the assembly 100 is compressed axially therein between the terminal portion 37 of the rod of the outer cylinder 310 and the annular lug 32, both of which provide it with abutments. The entire cross-sectional area of the top ring 10' bears against the seat 34 of the terminal portion 37. The bottom ring 10 bears against the lug 32 in a very localized zone 103 which, assisted by the resilience of the parts in contact, guarantees a sealed contact.

This third variant of the present invention operates in substantially the same way as the two preceding variants. During priming, after the differential piston 4 has been moved down to come into abutment against the sleeve 24 of the pump body 2, the hollow first piston 3 can continue to be pushed down so that its inner cylinder 300 rests against the step 44. This causes the tip of the needle 41 which bears in sealed manner against the edge 104 of the ring 10 to lift the ring upwardly. As a result, the contact 103 between the ring 10 and the lug 32 in the delivery channel 33 is broken. This provides a passage between the pump chamber 23 and the outside, initially via the interstices between the periphery of the ring 10 and the wall of the channel 33, and subsequently via the slots 311 in the seat 34. This mechanism is thus suitable for evacuating the air initially contained in the chamber 23.

It should be observed that because of the relative resilience of the outer cylinder 310, the compression force applied by the user also has the effect of deforming the cylinder 310 into a barrel-shape, thereby eliminating the empty space 320 between the cylinder 310 and the inside cylinder 300. This phenomenon taken in conjunction with the above-described phenomenon causes the partition 20 to bend further, thereby reinforcing the sealing between the tip of the needle 41 and the ring 10 at 104.

When the user stops pressing down the first piston 3, the partition 20 immediately seeks to return to its initial shape. This ensures that the contact 103 between the ring 10 and the lug 32 is reestablished very quickly so that the pump chamber 23 is again completely isolated from the outside. Since it is also isolated from the tank by means of the sealing lips 43 on the skirt 42 traveling over the sleeve 24, its increase in volume as the return spring 5 expands gives rise to suction therein. In the embodiment shown in FIG. 10, the suction may reach a considerable value by virtue, in particular, of the sealing lip 35 on the outer cylinder 310 of the piston rod 3 which prevents any air from infiltrating. Simultaneously, a suction force applied to this lip 35 effectively prevents the two cylinders 300 and 310 constituting the first piston 300 from coming apart under urging from the assembly 100. This reinforces their interconnection at the snap fastening 312, and in some cases, may even make the snap fastening 312 unnecessary.

As soon as the pistons have returned to the high position shown in FIG. 10, the passage provided between the skirt 42 and the sleeve 24 allows the pump chamber 23 to be filled with substance sucked in from the tank. The barrel deformation of the outer cylinder 310 of the first piston 3 has long since disappeared at this stage, with the assembly 100 pushing back against the seat 34 as soon as the pistons begin to rise.

When the first piston 3 is actuated subsequently, the substance trapped in the pump chamber 23 is compressed. The more flexible return spring 5 is always the first spring to move. As its length reduces with the pistons 3 and 4 being pushed down, the volume of the pump chamber 23 falls. The sealing lip 43 on the skirt 42 sliding over the sleeve 24, and the sealing lip 36 on the inner cylinder 300 of the first piston 3 serve to guarantee that the chamber 23 is isolated so that the pressure of the substance trapped therein increases. This then causes the differential piston 4 to move under the effect of pressure exerted on the step 44 against the force of the return spring 5. The ring 10 therefore continues to be securely maintained at 103 against the lug 32, particularly since the outer cylinder 310 tends to deform into a barrel shape and compress the priming assembly 100. Contact 104 with the needle 41 is then broken. The substance under pressure can then flow between the needle 41 and the ring 10 and reach the outside via the central holes through the ring 10, the partition 20, the ring 10', and the terminal portion 37 of the outer cylinder 310.

The substance continues to be delivered until the shoulder 45 of the differential piston 4 comes into abutment against the sleeve 24. The pump chamber 23 then ceases to reduce in volume and the pressure therein drops. The pressure soon becomes insufficient to resist the force exerted by the return spring 5 so the differential piston 4 rises and contact 104 between its needle 41 and the ring 10 is reestablished. On observing that no more substance is being delivered, the user releases the rod and the pump chamber 23 refills with substance in the same manner as it did after being primed, thereby preparing to deliver a metered quantity next time the pump is actuated.

Figure 12:
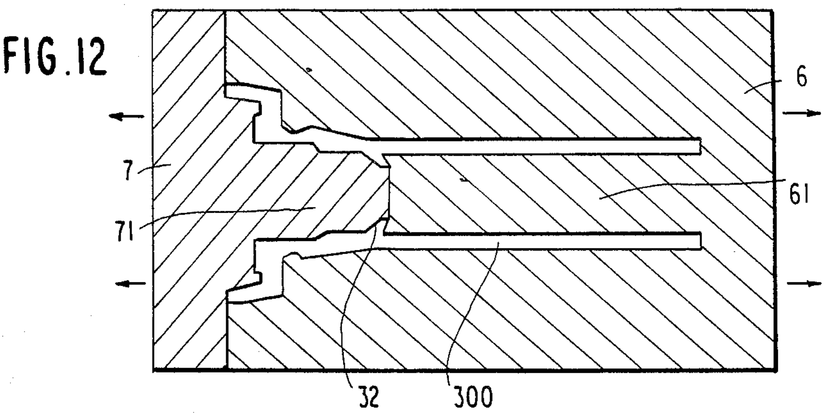
FIG. 12 is a section through a mold suitable for making the actuator rod of the precompression metering pump shown in FIGS. 10 and 11.

The hollow first piston 3 described above is easily molded without danger for the quality of the lug 32. For example, FIG. 12 is a diagram showing how the inner cylinder 300 could be manufactured. A two-part mold is used A first part 6 has a mold cavity matching the outside surface of the cylinder 300 and has a first finger 61 projecting into the middle of said cavity, said finger being complementary in shape to the inside shape of the channel 33 downstream from the lug 32. A second portion 7 of the mold has a second finger 71 which is complementary in shape to the inside shape of the channel 33 upstream from the lug 32. By pulling the portion 6 to the right of FIG. 12 and the portion 7 to the left, the cylinder 300 can be laid bare without applying force to the lug 32.

It will be understood that a similar molding system could be used for making the outer cylinder 310 of the first piston 3. Prior to being assembled with the inner cylinder 300, the priming assembly 100 should be engaged inside the inner cylinder, downstream from its lug. To make this easier, the assembly 100 is advantageously reversible. This applies to the assembly 100 as described above which includes two identical rings 10 and 10' even though only the ring 10 which comes into contact with the lug is required for proper operation of the pump. Assembly is then completed by engaging the outer cylinder 310 on the inner cylinder 300, and causing them to be snap fastened together, where applicable.

The third variant as described above with reference to FIG. 10 makes use of two sealing lips carried by the hollow first piston 3. It has been seen that each of them is active during a different stage of pump operation: the lip 36 on the inner cylinder 300 participates in isolating the pump chamber 23 while its contents is being compressed; and the lip 35 of the outer cylinder 310 ensures that considerable suction is developed inside the chamber 23. However, prior art metering pumps are sometimes arranged in such a manner that while the pistons are rising, the pump chamber 23 generates less suction. To this end, French patent No. 2 558 214, filed in 1984 by the firm Valois, provides, for example, one or more bores 48 through the differential piston 4. These bores are provided with fine lips 47 projecting from the step 44 and acting as non-return valves. Thus, they have no effect on putting the pump chamber 23 under pressure. In contrast, while its volume is being increased, the bores 48 put the chamber 23 almost immediately into communication with the tank, long before the skirt 42 has left the sleeve 24.

With this type of prior art metering pump, the sealing lip 35 on the outer cylinder 310 is no longer of any use. As shown in FIG. 11, it is then preferable to omit this lip in order to reduce friction between the hollow first piston 3 and the pump body 2, thereby making it possible to use a return spring 5 which is even less stiff. Instead, a simple annular rim 35 is provided. The diameter of this rim is less than the inside diameter of the pump body 2, with the rim 35 being shaped to make appropriate contact with the turret 1 when the pump is in the rest position. This contact is useful for providing an abutment that determines the top position of the hollow first piston 3. It may also be required for isolating the tank from the outside when communication with the air 13 is provided elsewhere. It will be understood that molding the rim 35 integrally with the outer cylinder 310 presents no particular difficulties. By making the hollow first piston 3 in two portions, it is even possible to adapt the piston easily to this second type of metering pump since the inner cylinder 300 and the priming assembly 100 remain unchanged. The molds for these parts therefore remain applicable to both kinds of metering pump. However, it should be observed that in this embodiment, the snap fastening 312 or some other equivalent connection means cannot be omitted for keeping the two cylinders 300 and 310 together, particularly when the pistons are rising without there being any suction.

Figure 13:
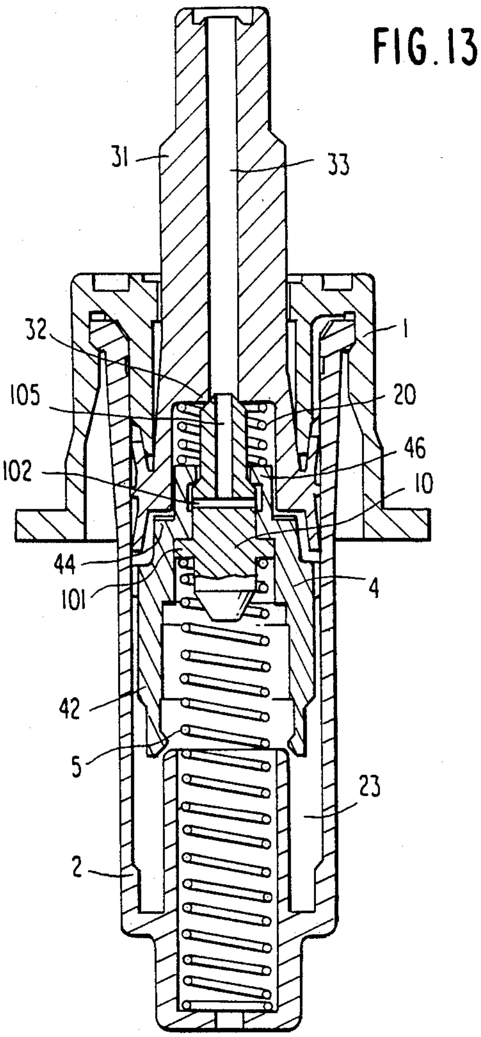
FIGS. 13 and 14 are longitudinal sections through a fourth variant of a precompression metering pump including the improvement of the present invention. The pump is shown in its rest position in FIG. 13, and during priming in FIG. 14.
Figure 14:
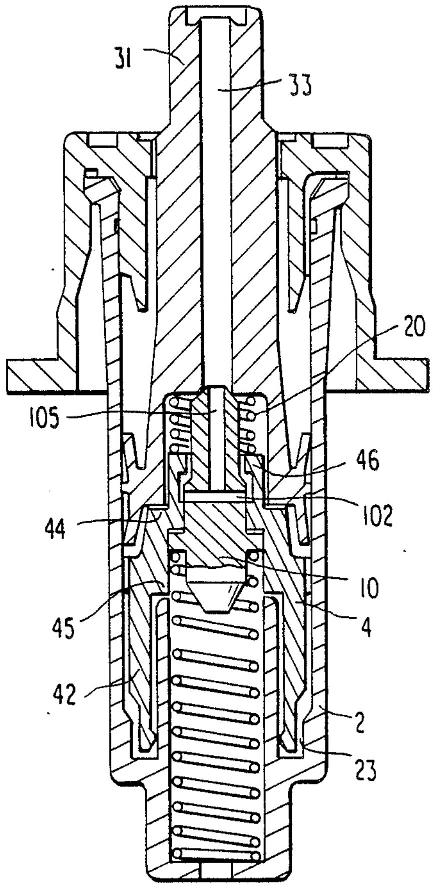

In the fourth variant of the invention described herein, modifications are made to the differential piston 4, and more particularly to its needle 41. As can be seen in FIGS. 13 and 14, the needle 41 is, roughly speaking, replaced by a cylindrical part 10 sharing the same axis as the pump and engaged inside the piston 4 which is now constituted solely by its skirt 42 and its step 44. The base of the cylindrical part 10 is solid. It is provided with an external rim 101 enabling the spring 5 to urge it against the piston 4. Thus, in use, the part 10 is kept in fixed disposition relative to the piston and therefore reproduces the same method of operation as the prior art pumps. The top portion of the part 10 includes an inside channel 105 which opens out directly into the channel 33 of the rod 31 of the piston 3. This inside channel 105 communicates with another channel 102 running horizontally and situated about halfway along the cylindrical part 10. When the pump is fully engaged in the piston 4, i.e. when the pump is in normal operation, then the horizontal channel 102 is isolated by means of an upper skirt 46 specially provided for that purpose in the top portion of the piston 4. Finally, a cylindrical spring 20 bears against said upper skirt 46. It surrounds the head of the cylindrical part 10 in order to bear against the choking step 32 in the channel 33 in the rod 31. Like the functionally equivalent resilient means provided in the preceding variants, the spring 20 must be stiff so that at least at the beginning of the stroke of the actuating rod 31, the effect of the rod being pushed down is to give rise to identical motion in the piston 4. The spring 20 may be precompressed, for example.

Thus, as in the prior art, pressing down the rod 31 drives the piston 4 into the pump by virtue of the abutment provided by the choking step 32. The substance thus put under pressure causes the piston 4 to be moved away together with the cylindrical part 10 which is then engaged by the upper skirt 46 which is generally hook-shaped, specially for this purpose. During priming, the actuator rod 31 can be pushed down further. Here again, the air in the pump chamber 23 does not oppose the rod being pushed down until the piston 4 comes into abutment against the sleeve 24. The user can then compress the spring 20. This gives rise to relative motion between the cylindrical part 10 and the piston 4, thereby disengaging it from the upper skirt 46 (see FIG. 14). The compressed air can then escape via channels 102, 105, and then 33 thus reaching the outside and not the tank, i.e. thus satisfying the object of the invention.

Figure 15:
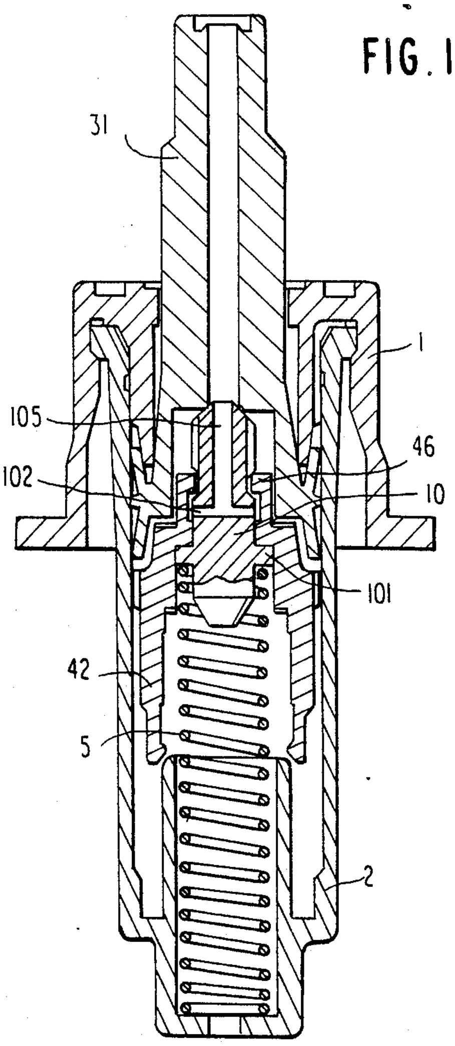
FIGS. 15 and 16 are longitudinal sections through a fifth variant of a precompression metering pump including the improvement of the present invention
Figure 16:
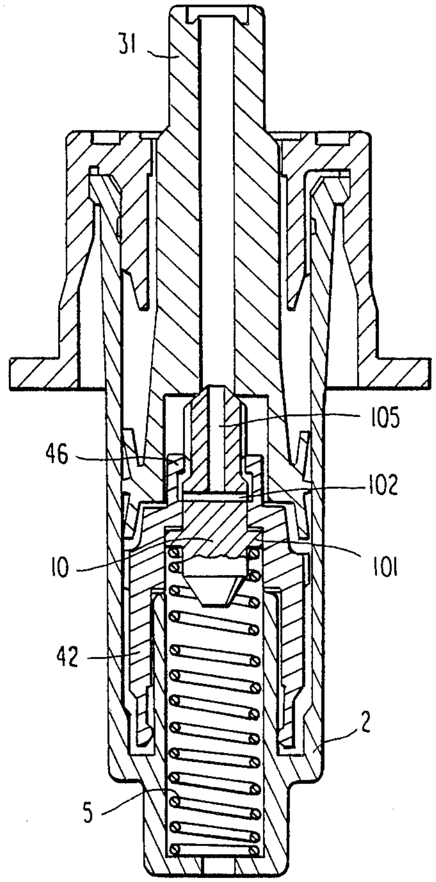

The fifth variant of the invention shown in FIGS. 15 and 16 is very close to the fourth. In particular, the cylindrical part 10 is almost entirely identical having a rim 101, channels 102 and 105, etc. The difference lies solely in the resilient means which allow it to disengage the upper skirt 46 of the piston 4 at the end of the first downwards stroke of the actuator rod 31. Instead of the spring 20, the top portion of the cylindrical part 10 is provided with fins with chamfered bottom ends. The upper skirt 46 can then be deformed when its hook-shaped edge moves over the chamfering under the effect of external thrust. In this case, the air escapes between the fins in order to reach the channel 102.

These five variants of the invention clearly demonstrate their common point. During priming, since it is possible to put the differential piston 4 into abutment and continue to push down the actuator rod 31, the user can compress resilient means which are not used during normal operation of the pump. The relative displacement of the parts obtained in this way causes a part to be opened to allow the air which was initially contained in the pump chamber to be exhausted outside the receptacle. The first time the actuator rod rises again, the pump chamber generates suction, thereby facilitating the filling thereof with substance for delivery next time the pump is actuated.

What is claimed is:

1. A precompression metering pump for dispensing a liquid or a paste and having improved priming, said pump comprising:

a pump body having a bottom communicating with a tank of said substance and a top open to the atmosphere;

a hollow piston for isolating a pump chamber inside said pump body, and for putting it under pressure, said hollow piston extending via said open top of said pump body in the form of an actuator rod which is pierced from end to end by an outlet channel opening out to a free end of said rod;

a differential piston received in said pump chamber in order to interrupt communication between said tank and said outlet channel; and a return spring for returning said hollow piston and said differential piston;

wherein the metering pump is further provided with a priming assembly including resilient means and at least one cylindrical part which co-operates with said differential piston and said actuator rod in order to constitute, within said outlet channel, a first outlet non-return valve reserved for dispensing said substance, and a second outlet non-return valve enabling the air initially contained in said pump chamber to be evacuated to the atmosphere, said first non-return valve being closed when said second non-return valve is open, and vice versa.

2. A pump according to claim 1, wherein, while an external force is being exerted on said actuator rod in order to urge said hollow piston into said pump body, said first outlet nonreturn valve opens when said pump chamber gives rise to sufficient pressure to displace said differential piston against the return force transmitted by said return spring and said second outlet non-return valve opens when said differential piston comes into abutment against said pump body, said resilient means being stiffer than said return spring.

3. A pump according to claim 1, wherein said priming assembly in which said at least one cylindrical part is constituted by a ring having a base, is received with radial clearance inside said outlet channel of said actuator rod, and is held in place by abutment between thrust means and a lug provided by said channel and respectively situated adjacent to said free end of said actuator rod and adjacent to said pump chamber, the base of said ring bearing internally in a first annular contact zone against said differential piston in order to form said first outlet non-return valve and externally in a second annular contact zone against said lug in order to form said second outlet non-return valve, the shapes of said cylindrical part, of said differential piston, and of said rod in said annular compact zones being such that when said differential piston comes into abutment against said pump body, said actuator rod can be pushed down further into said pump body and said second annular contact zone disappears.

4. A pump according to claim 3, wherein said base of said ring is frustoconically shaped and said lug is convexly curved.

5. A pump according to claim 3, wherein said base of said ring is plane, whereas said lug is constituted by a sealing lip directed towards said free end of said actuator rod.

6. A pump according to claim 3, wherein said thrust means are constituted by a narrowing of said outlet channel.

7. A pump according to claim 3, wherein said resilient means are constituted by a precompressed spring.

8. A pump according to claim 3, wherein a hollow end fitting is fixed in sealed manner in the free end of said actuator rod, thereby reducing the cross-section of said outlet channel and constituting said thrust means serving as the abutment for said priming assembly.

9. A pump according to claim 8, wherein said hollow end fitting has at least two external annular serrations co-operating with at least two annular notches in said free end of said actuator rod in order to snap fasten therewith

10. A pump according to claim 8, wherein said hollow end fitting extends beyond the free end of said actuator rod and is made of a plastic material which is more rigid than the material forming said first piston.

11. A pump according to claim 10, wherein said end fitting has at least two external annular serrations together with a collar, said serrations biting into the inside of said free end of said actuator rod and said collar bearing against the free end of said actuator rod.

12. A pump according to claim 8, wherein said end fitting is fixed to said ring, said resilient means being constituted by tongues interconnecting said end fitting and said ring.

13. A pump according to claim 12, wherein said tongues lie parallel to the axis of said outlet channel.

14. A pump according to claim 12, wherein said tongues wind spirally around the axis of said outlet channel.

15. A pump according to claim 8, wherein said hollow piston is made in a mold comprising at least two dies, one of said dies having a finger which is complementary in shape to said outlet channel from said lug to said free end of said rod, with unmolding being performed by pulling out said finger via said end.

16. A pump according to claim 3, wherein said hollow piston is constituted by a hollow inner cylinder and a hollow outer cylinder, said cylinders being suitable for fitting one inside the other, said lug projecting from the inside wall of said inner cylinder whereas said thrust means are constituted by a reduction in the cross-section of said outer cylinder.

17. A pump according to claim 16, wherein said inner cylinder includes a sealing lip directed towards said pump chamber in order to slide in sealed manner within said pump body.

18. A pump according to claim 17, wherein said cylinders of said hollow piston are provided with connection means for fixing them together.

19. A pump according to claim 18, wherein said connection means for said cylinders of said hollow piston are constituted by an annular notch provided in the outside surface of said inner cylinder and an annular projection carried by the inside surface of said outer cylinder, said notch and said projection being adapted to snap fastened together when said cylinders are engaged one inside the other.

20. A pump according to claim 17, wherein said outer cylinder includes a sealing lip directed towards the open top of said pump body in order to slide in sealed manner within said pump body.

21. A pump according to claim 18, provided with an additional admission non-return valve opening when the pistons begin to rise, the pump being wherein said outer cylinder includes a rim extending towards the open top of said pump body and sliding with clearance within said pump body.

22. A pump according to claim 16, wherein said outer cylinder has a smaller sized terminal portion whose inner base is suitable, when said cylinders are engaged one within the other, to face the inside of said inner cylinder in order to constitute said thrust means of said channel.

23. A pump according to claim 22, wherein a ring identical to said at least one cylinder part constituted by said ring is also received in said channel downstream from said resilient means.

24. A pump according to claim 23, wherein said inner base of said terminal portion of said outer cylinder has an area substantially equal to that of the section of said rings such that either of said rings may bear thereagainst.

25. A pump according to claim 24, wherein said resilient means are constituted by a thin cylindrical partition interconnecting said rings and having the same inside diameter as said rings.

26. A pump according to claim 25, wherein said inside base of said terminal portion of said outer cylinder projects as a seat; wherein when said cylinders of said hollow piston are engaged one inside the other, said inner cylinder extends to the surface of said seat such that an empty space exists at the end of said inner cylinder corresponding to the thickness through which said seat projects; and wherein radial slots are provided through said seat in order to put said free space into communication with said channel.

27. A pump according to claim 16, wherein said inner cylinder is made in a mold constituted by at least two dies, one of said dies having a finger which is complementary in shape to the inside of said inner cylinder as far as said lug, with unmolding taking place by withdrawing said finger via the end of said inside of said inner cylinder which is opposite to said lug such that said finger does not rub over said lug.

28. A pump according to claim 1, wherein said at least one cylindrical part comprises a solid bottom portion provided with an outer rim, a top portion pierced by a vertical channel communicating with a horizontal channel situated approximately halfway therealong, said part engaging in said differential piston such that said rim prevents it from rising through said differential piston, and such that an upper skirt provided with a hook-shaped rim on said differential piston covers said horizontal channel and forms said second outlet non-return valve, said first outlet non-return valve being constituted by the top of said at least one cylindrical part bearing against a choking step presented in said outlet channel of said rod, and wherein said resilient means oppose relative displacement between the actuator rod and said differential piston.

29. A pump according to claim 28, wherein said resilient means are constituted by a spring, preferably a precompressed spring, surrounding the top portion of said cylindrical part and bearing against said upper skirt of said piston and also against said choking step of the channel of said actuator rod.

30. A pump according to claim 28, wherein said resilient means co-operate with chamfered fins carried by said top portion of said cylindrical part.

* * * * *